US008064714B2

(12) United States Patent
Albiez

(10) Patent No.: US 8,064,714 B2
(45) Date of Patent: Nov. 22, 2011

(54) METHOD FOR BINARIZING A DIGITAL GRAY VALUE IMAGE TO GENERATE A BINARIZED GRAY VALUE IMAGE AND ARRANGEMENT FOR CARRYING OUT SAID METHOD

(75) Inventor: Michael Albiez, Aalen (DE)

(73) Assignee: Carl Zeiss NTS GmbH, Oberkochen (DE)

( * ) Notice: Subject to any disclaimer, the term of this patent is extended or adjusted under 35 U.S.C. 154(b) by 1112 days.

(21) Appl. No.: 11/808,283

(22) Filed: Jun. 8, 2007

(65) Prior Publication Data
US 2008/0044095 A1 Feb. 21, 2008

(30) Foreign Application Priority Data

Jun. 9, 2006 (DE) .................. 10 2006 026 842

(51) Int. Cl.
G06K 9/40 (2006.01)
(52) U.S. Cl. ........ 382/266; 382/199; 382/237; 382/195; 382/181; 382/128; 358/1.9; 358/448
(58) Field of Classification Search .................. None
See application file for complete search history.

(56) References Cited

U.S. PATENT DOCUMENTS

| 6,229,578 B1 | 5/2001 | Acharya et al. |
| 6,757,442 B1 | 6/2004 | Avinash |
| 2003/0031366 A1 | 2/2003 | Li et al. |

OTHER PUBLICATIONS

Chen et al. "A Morphological Edge Detector for Gray-Level Image Thresholding", 2005, ICIAR 2005, LNCS 3656, pp. 659-666.*
Russ, Chapter 8 Processing Binary Images, The image processing handbook 5th edition, 2007, pp. 443-452.*
Murase et al, "An anisotrophic diffusion method for denoising dynamic susceptibility contrast-enhanced magnetic resonance images", (2001), Phys. Med. Biol. 46, pp. 2713-2723.*
Neoh et al, "Adaptive Edge Detection for Real-Time Video Processing using FPGAs", 2005.*
Sahoo, P.K. et al, "A Survey of Thresholding Techniques", Computer Vision, Graphics, and Image Processing, 1988, pp. 233 to 260, 41, Academic Press, Inc.
Charette, C. et al, "Development and Integration of a Micro-Computer based Image Analysis System for Automatic PCB Inspection", IEEE, 1988, pp. 129 to 135.
Wang, L. et al, "Threshold selection by clustering gray levels of boundary", Pattern, Recognition Letters (2003), pp. 1983-1999, 24, Elsevier Science B.V.
Translation into English of German Office action issued on Jul. 23, 2010.

* cited by examiner

Primary Examiner — Sath V Perungavoor
Assistant Examiner — Jason Heidemann
(74) Attorney, Agent, or Firm — Walter Ottesen

(57) ABSTRACT

A method for binarizing a digital gray value image includes generating a binary edge image from the gray value image so as to cause existing edges to be determined as line areas around an edge; and, thereafter, computing a mean value of gray values of the gray value image in all regions which correspond to the line areas around an edge of the binary edge image with the mean value defining a threshold value for the generation of a binarized gray value image.

13 Claims, 15 Drawing Sheets

Absolute Frequency of Occurrence of the Level of Intensity

Level of Intensity

8

25  26 27 28  29

30

METHOD FOR BINARIZING A DIGITAL GRAY VALUE IMAGE TO GENERATE A BINARIZED GRAY VALUE IMAGE AND ARRANGEMENT FOR CARRYING OUT SAID METHOD

CROSS REFERENCE TO RELATED APPLICATION

This application claims priority of German patent application no. 10 2006 026 842.3, filed Jun. 9, 2006, the entire content of which is incorporated herein by reference.

FIELD OF THE INVENTION

The invention relates to a method for binarizing a digital gray value image. The invention further relates to a computer system and a computer program for carrying out such a method as well as an image recording arrangement with a computer program of this kind.

BACKGROUND OF THE INVENTION

A digitally recorded image can be used to determine data in the image via an image processing. A frequent application is the determination of characteristics of objects which are contained in the image. Such characteristics can, for example, be the size, position, centroid, periphery or roundness of at least one object in a limited image region or in the entire image. Another application is to determine a maximum resolution of the recording arrangement based on a gray value image with the gray value image having been recorded by the recording arrangement. In order to carry out such analyses, it is advantageous when the objects are separated or segmented clearly from the background. This procedure requires the setting of a limit or of a threshold value so that each gray value image point, which exceeds this value or drops below this value, is set in a new image either as a white point or a black point. For such a threshold value method, the starting image is binarized, more specifically, precisely two segments in the form of a background and an object are formed.

In the state of the art, many methods are known to binarize a gray value image by assigning a suitable threshold value. An overview is presented, for example, in the article of P. K. Sahoo et al entitled "A Survey of Thresholding Techniques" published in Computer Vision, Graphics and Image Processing 41, pages 233 to 260 (1988). Some of the methods presented in this article have the disadvantage that a subjective evaluation by a user is required during an intermediate step so that no objective image evaluation is achieved. In methods, which determine a threshold value in a completely automated manner, there is one disadvantage that the results of a binarization, which is achieved via the different methods, depart greatly from each other as is shown in Table 1 of the above-mentioned article. In some methods, important image details are no longer present after binarization and, in other methods, details are added which were not originally recorded. A user would therefore have to have a very precise knowledge as to which method is best suitable for which type of gray value image. Furthermore, the user would have to decide in advance as to which image data are significant in order to select a suitable image processing. In order to obtain a good binarization result, subjective evaluations would be needed in advance of applying an image processing method. Since there is a very low probability that the correct method would be used, several methods have to be applied for reliability and the binarization results compared to each other. Such a procedure is associated with a high expenditure of time.

SUMMARY OF THE INVENTION

It is an object of the invention to provide a method wherein a reproduction of an originally recorded gray value image is achieved in binarized form in a short time which is as true as possible without loss of image details and without adding details which were not present initially. A user need not possess any detailed knowledge of image processing methods and subjective evaluations before and during the execution of an image processing method are not required.

The method of the invention is for binarizing a digital gray value image. The method includes the steps of: generating a binary edge image from the gray value image so as to cause existing edges to be determined as line areas around an edge; and, thereafter, computing a mean value of gray values of the gray value image in all regions which correspond to the line areas around an edge of the binary edge image with the mean value defining a threshold value for the generation of a binarized gray value image.

According to a feature of the invention, a binary edge image is so generated from a recorded gray value image that edges, which are present in the gray value image, are determined as line areas around edges. Thereafter, a mean value of gray values of the gray value image is computed in all line areas around edges of the binary edge image. The mean value defines a threshold value for the generation of a binarized gray value image. An advantage of this method is that it is not required to record a histogram for the gray value image with a frequency of occurrence distribution of gray values in the gray value image and to determine therefrom a threshold value for the binarization.

According to an embodiment of the invention, the binary edge image is formed by means of a gradient image generated on the basis of the gray value image. Preferably, a difference operator is used for the generation of the gradient image with this difference operator being selected from the group comprising: Sobel operator, Prewitt operator, Laplace operator, Kirsch operator and Roberts operator. Also, other difference operators can be used if a gradient image can be generated thereby. Preferably, the gray value image is subjected to a smoothing process before the generation of the gradient image. This can, for example, take place with the use of a median filter. A smoothing process of this kind functions to reduce the noise intensity in the originally recorded gray value image.

According to a preferred embodiment of the invention, the gradient image is generated by coupling a first directional gradient image with a second directional gradient image. The first directional gradient image is created in that gradients in the gray value image are determined in a first direction and the second directional gradient image is created in that gradients in the gray value image are determined in a direction perpendicular to the first direction. A procedure of this kind is advantageous, for example, with the use of a Sobel operator. With a gradient determination of this kind, the direction of the gradients can be detected at edges to be identified. This is advantageous because line areas around edges with closed paths can be determined. When such paths are determined, then the threshold value for the binarization can be immediately computed in the line areas around edges as mean value of gray values of the gray value image.

If closed paths are not sought so that, for example, also half circles can be determined, a first additional threshold value can be assigned to the gradient image. Gradient image points with a brightness magnitude above the first additional threshold value are set to logic 1 and gradient image points having a brightness magnitude below the first additional threshold value are set to logic 0 so that a binary edge image is generated wherein the gradient image points, which are set to logic 1, form line areas around edges and the gradient image points, which are set to logic 0, form a background. In this way, a binary edge image with line areas around edges is created on a black background. The first additional threshold value amounts to preferably a fourth of the maximum gradient in the gradient image. Such a relatively low threshold value is advantageous because, in this way, only a relatively small amount of image data is masked out from the gradient image present as a gray value image.

In the event that a further reduction of noise signals is wanted, the binary edge image can be subjected to a smoothing process so that a smoothed binary edge image is generated. Thereafter, a second additional threshold value is set and the image points with a brightness magnitude above the second additional threshold value are set to logic 1 and image points having a brightness magnitude below the second additional threshold value are set to logic 0. The edge image points, which are set to logic 1, form line areas around edges and the edge image points, which are set to logic 0, form a background in order to generate an additional binary edge image. Preferably, the second additional threshold value amounts to half of the maximum gradient in the smoothed binary edge image. Since the basis is a binary image, this relatively high threshold value can be used without masking out important image data.

BRIEF DESCRIPTION OF THE DRAWINGS

The invention will now be described with reference to the drawings wherein.

DESCRIPTION OF THE PREFERRED
EMBODIMENTS OF THE INVENTION

Figure 15:
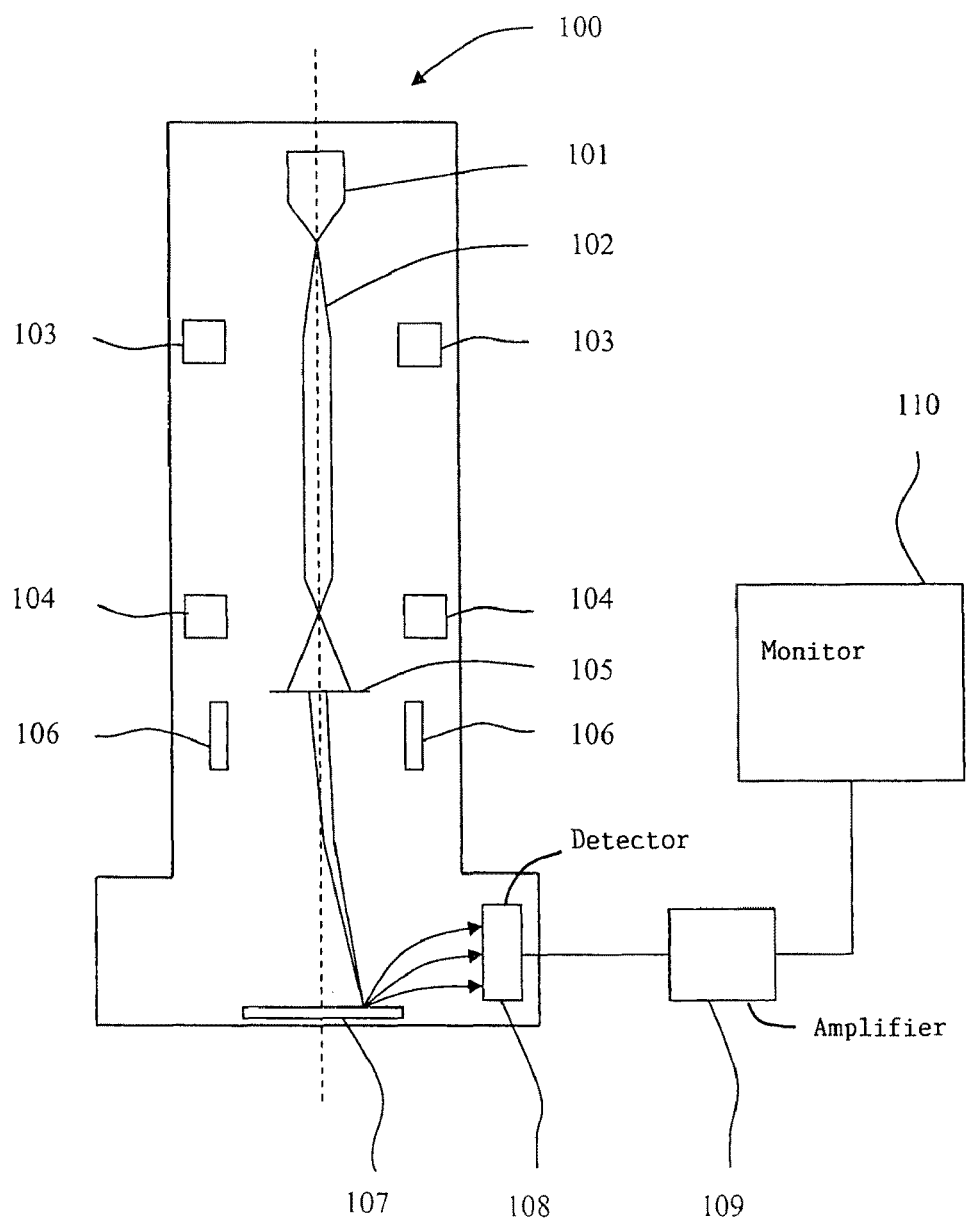

A raster electron microscope 100 having a monitor 110 is shown in FIG. 15. The monitor can display a gray value image. The raster electron microscope 100 includes an electron source 101 which emits an electron beam 102 which is focused by electromagnetic lenses 103 and 104. After passing an aperture diaphragm 105, the electron beam is deflected by deflecting coils 106 onto a specimen 107, which is to be investigated, and is passed linearly in a raster manner over the surface of the specimen. When the electron beam impinges upon the specimen, secondary electrons are, inter alia, liberated and these secondary electrons are detected by a detector 108. The signals of the detector are conducted to a downstream amplifier 109 to which the monitor 110 is coupled and with which a gray value image can be displayed.

Figure 1:
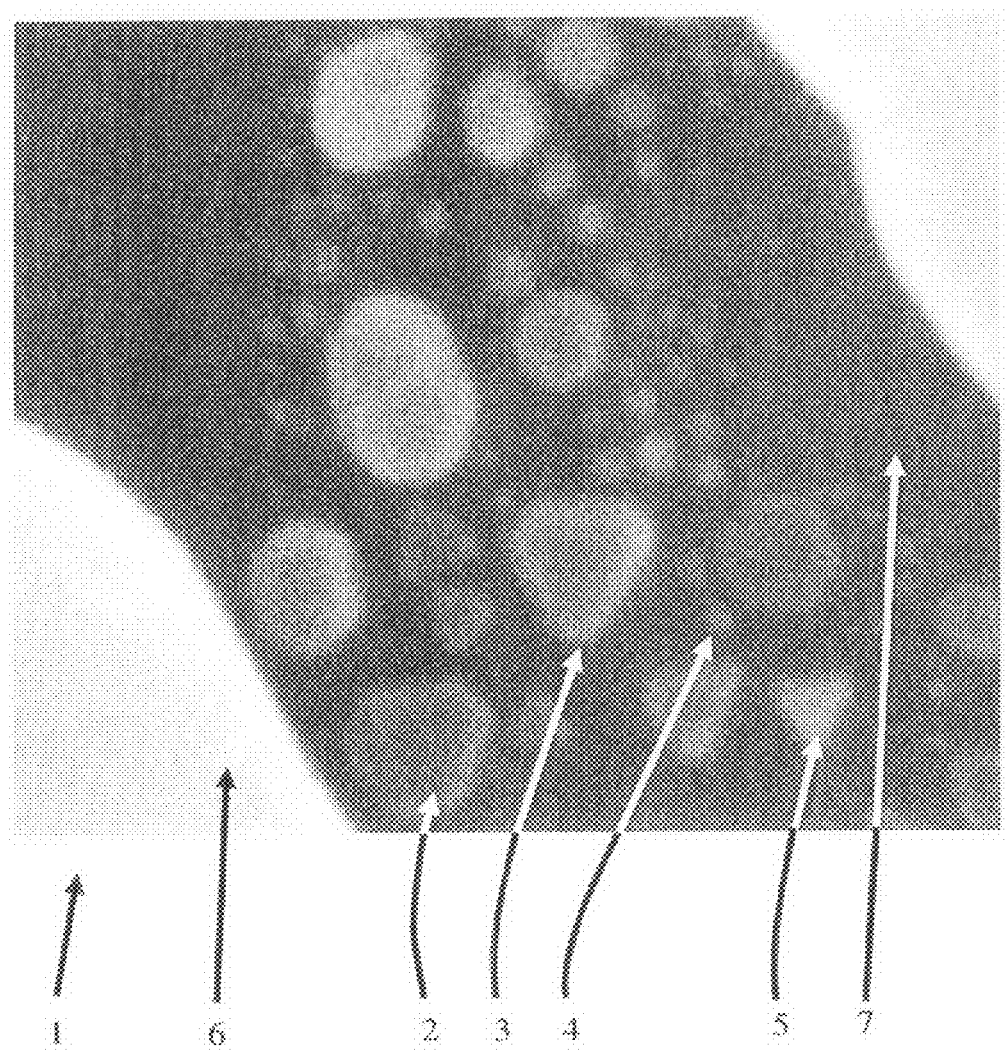
FIG. 1 is a recorded digital gray value image which is to be binarized.
Figure 13:
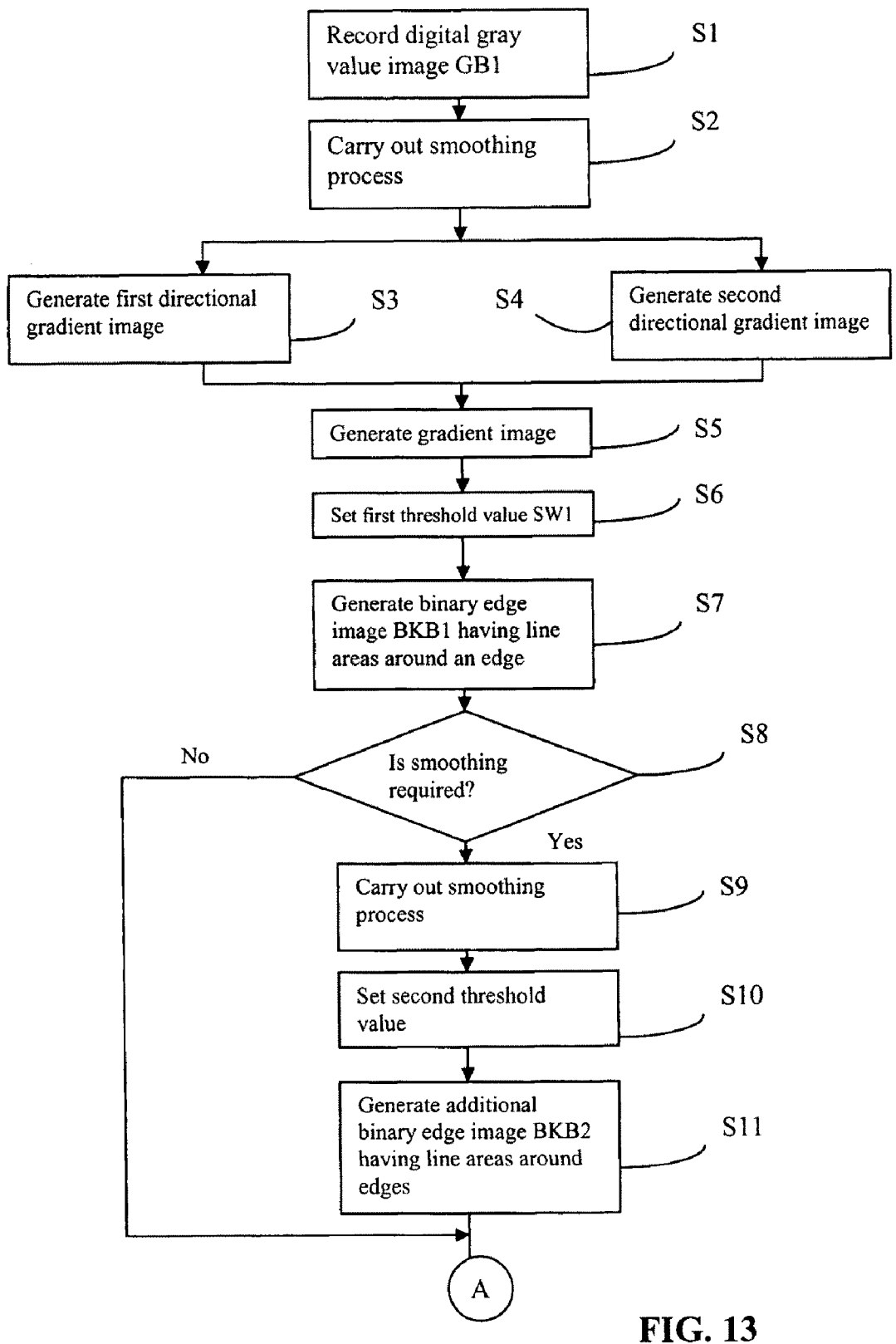
FIGS. 13 and 14 show respective portions of a flow diagram containing the most important steps of the method of the invention; and, FIG. 15 is a schematic cross-sectional view of an electron microscope having a monitor.
Figure 14:
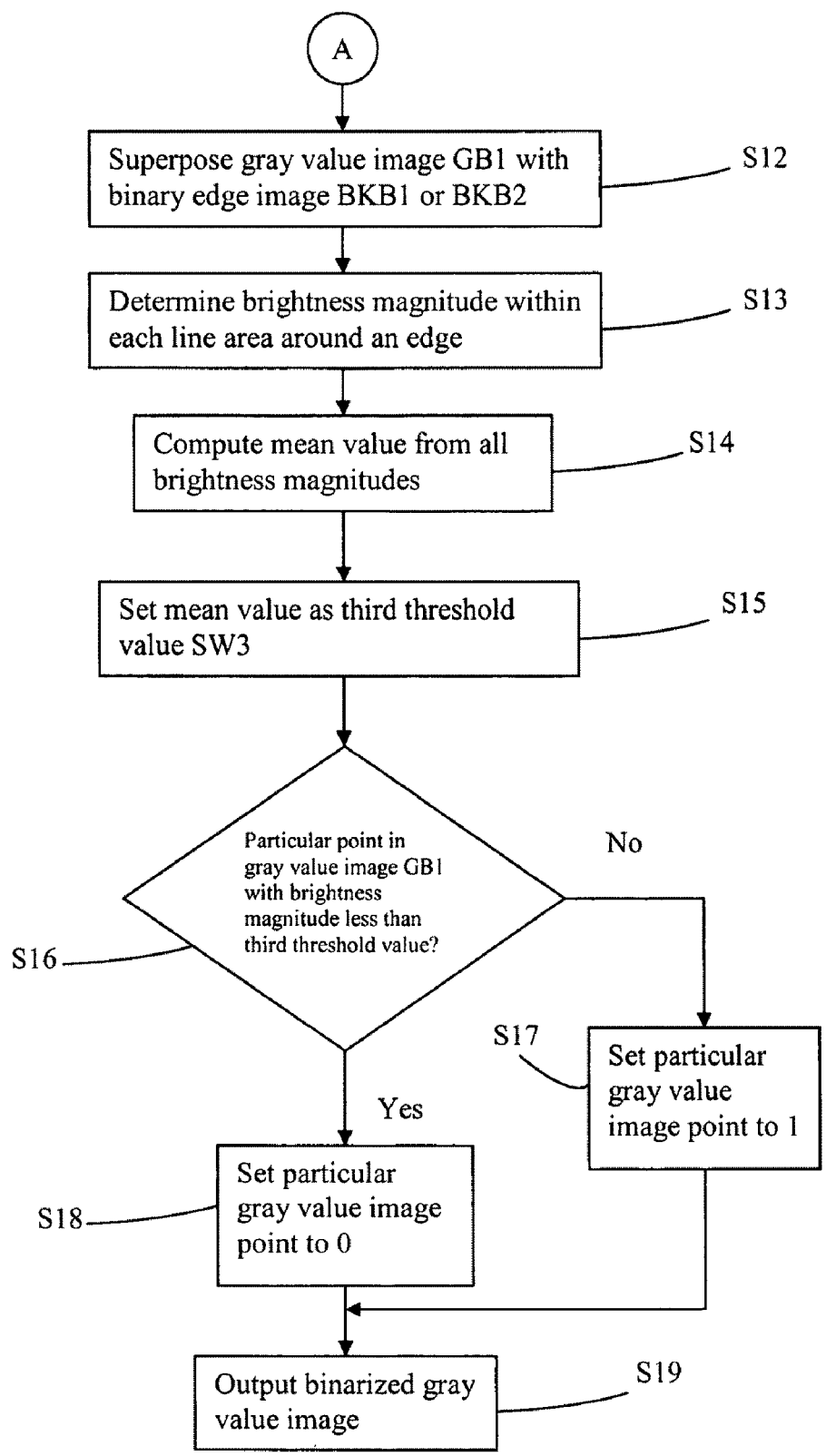

In FIG. 1, a digital gray value image 1 is shown which is recorded with a raster electron microscope (see step S1 in the flow diagram of FIG. 13). The digital gray value image in FIG. 1 shows relatively bright circularly-shaped and multi-cornered objects (2, 3, 4) in different sizes on a darker appearing background 7. The objects (2, 3, 4) are shown in different shades of gray. In part, the objects have a brighter border region 5 when compared to their centers so that the objects are easily recognizable for the human eye on the dark background 7. In the recording, relatively bright regions 6 are detectable compared to the objects (2, 3, 4) and these bright regions assume a large image area.

Figure 4:
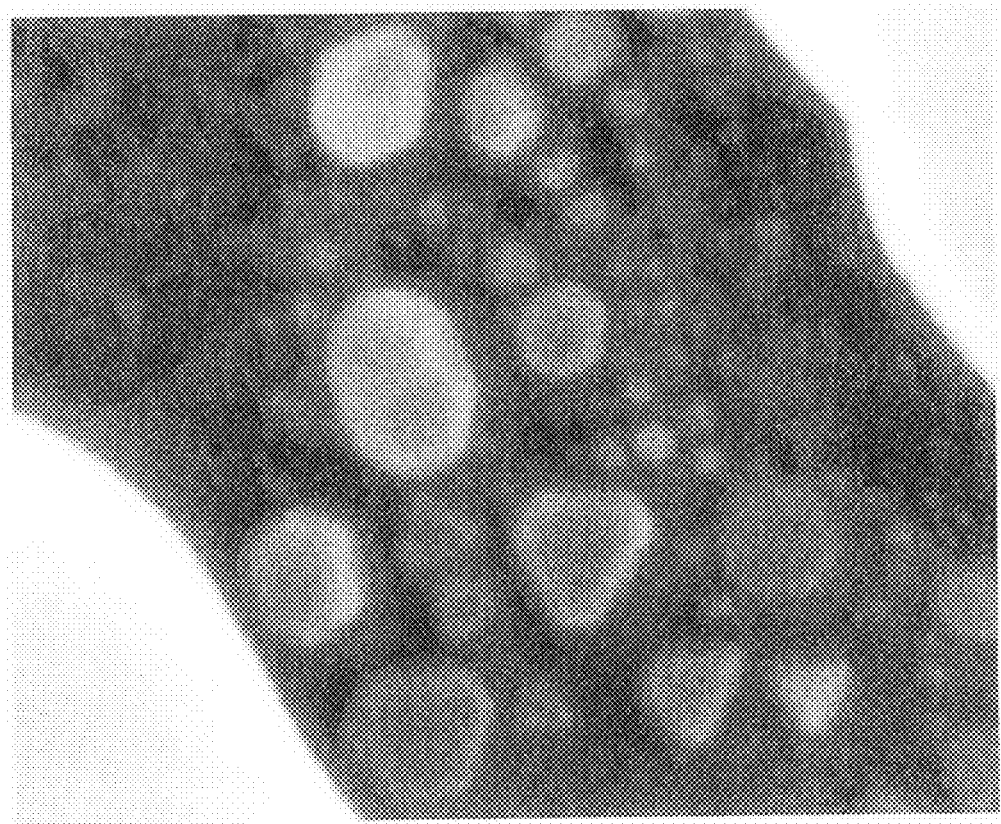
FIG. 4 is a smoothed gray value image.
Figure 4:
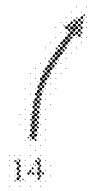

According to one embodiment of the invention, the image processing takes place in such a manner that, in step S2, this gray value image is subjected to a smoothing process so that a smoothed gray value image 14 is present as shown in FIG. 4. This can be carried out, for example, with a 3×3 median filter. The smoothed gray value image 14 shows reduced noise signals compared to the gray value image 1.

Figure 5:
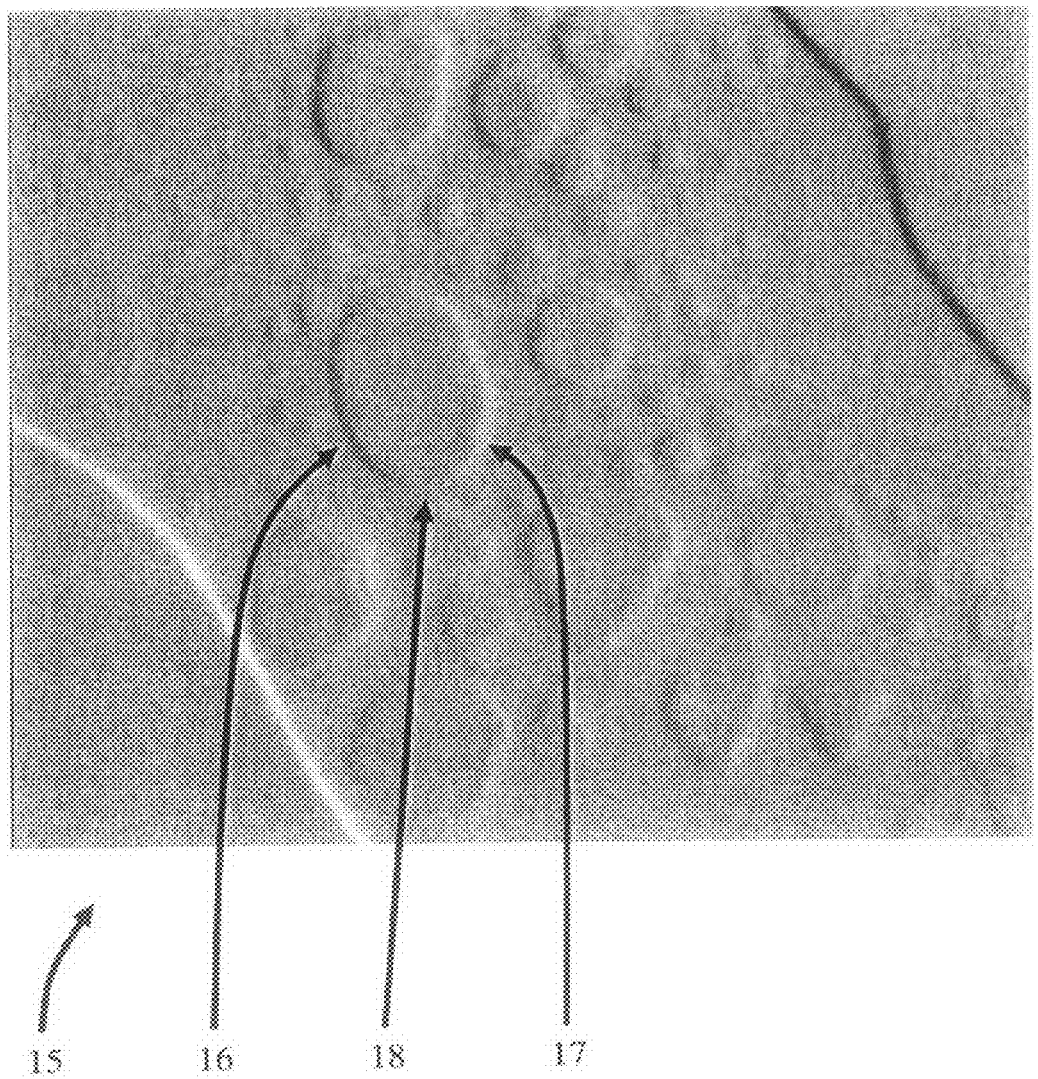
FIG. 5 is a first directional gradient image on the basis of the smoothed gray value image of FIG. 4.

Thereafter, a first directional gradient image can be generated in step S3. In the first directional gradient image 15 shown in FIG. 5, a gradient is determined in line direction for each point line based on the smoothed gray value image 14. At the edges, which are present in line direction, darker or brighter lines result as shown by reference numerals 16 and 17 in FIG. 5. If, during scanning in the line direction (x-direction), no gradient is detected, an average gray value appears which is not distinguishable by a brighter or darker line from the surroundings (see reference numeral 18). In a further step S4, the procedure for determining a gradient is carried out also in the column direction (y-direction) on the basis of the smoothed gray value image 14.

Figure 6:
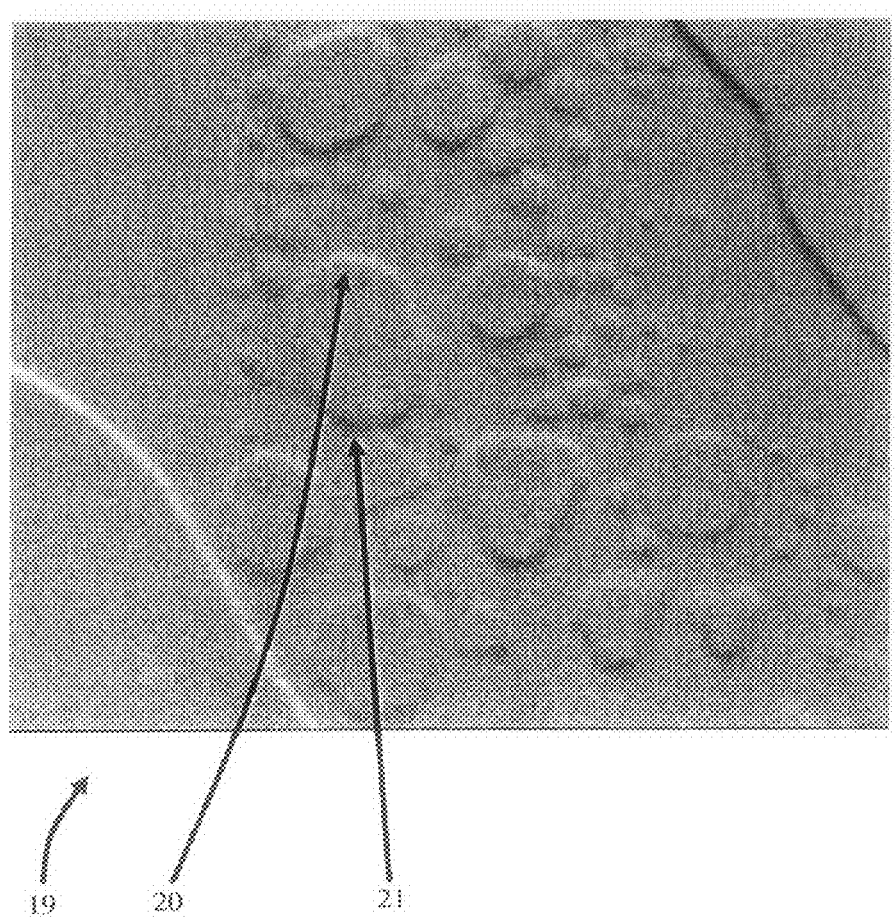
FIG. 6 is a second directional gradient image on the basis of the smoothed gray value image of FIG. 4.
Figure 7:
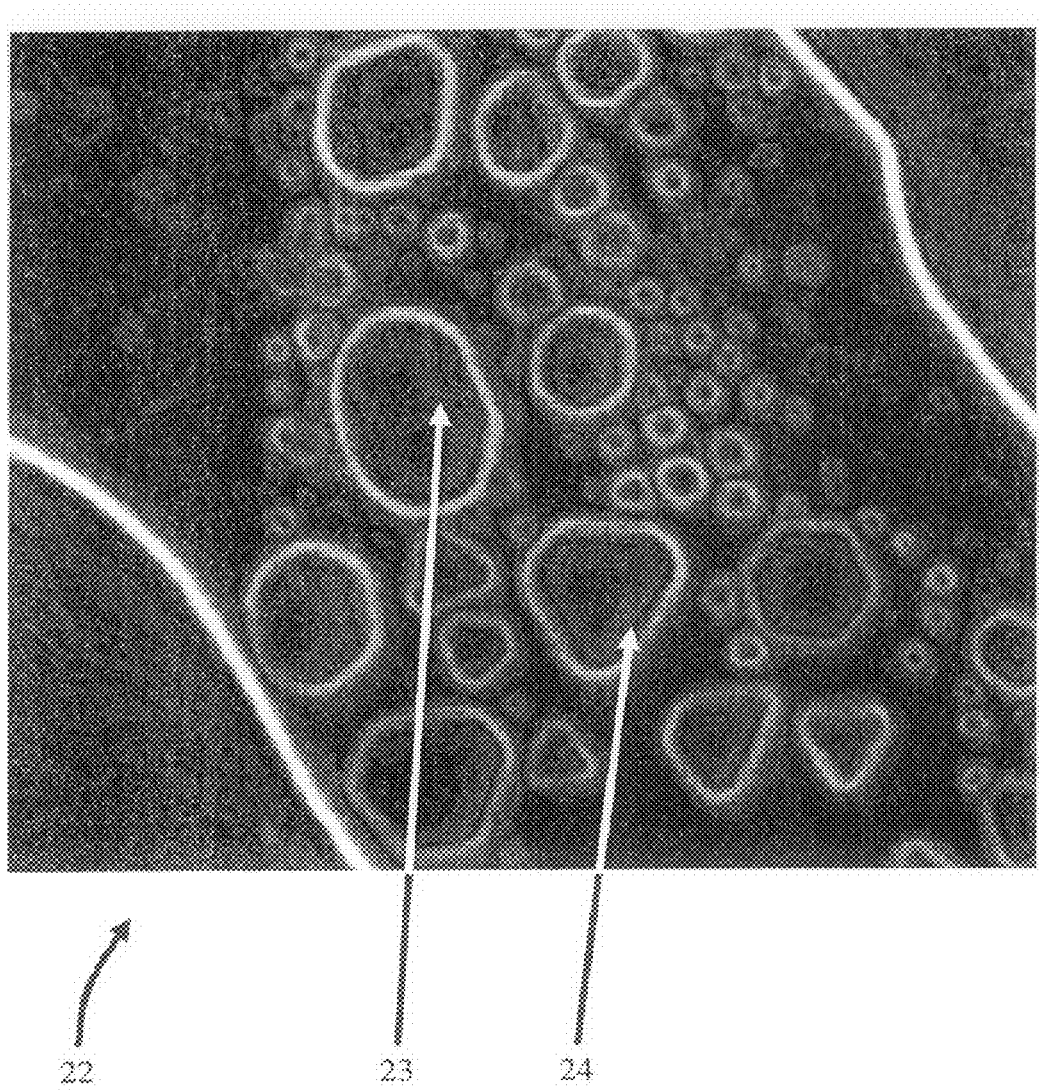
FIG. 7 is a gradient image from the coupling of the first directional gradient image of FIG. 5 and the second directional gradient image of FIG. 6.

FIG. 6 shows a second directional gradient image 19 and, for each point column, a gradient was determined in column direction. From FIG. 6, it can be detected that, for example, a brighter line 20 and a darker line 21 result at the edge of an object edge in the y-direction. When the two directional gradient images 15 and 19 are coupled to each other (step S5), for example, by squaring the particular gray value of each image point of the first directional gradient image 15 and of the second directional gradient image 19 and by thereafter adding the squares for each image point, then there results the gradient image 22 shown in FIG. 7. Of the objects present, primarily the outlines in the regions of their edges can be detected. In addition, somewhat darker regions (23, 24) can be seen within the objects on a still darker background.

Figure 8:
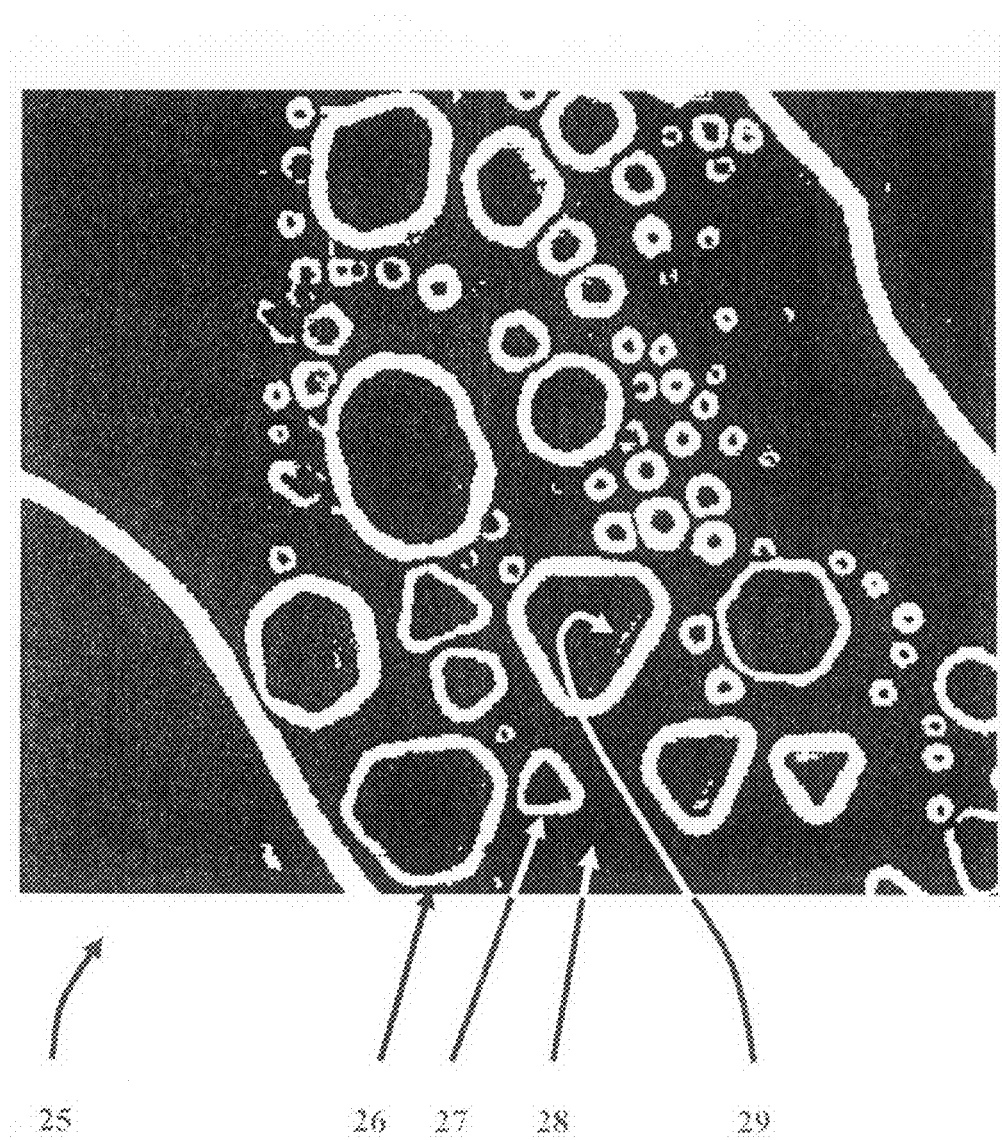
FIG. 8 shows a binary edge image having line areas around edges on the basis of the gradient image of FIG. 7.

In step S6, a first threshold value SW1 is set, for example, a quarter of the maximum gradient in the gradient image 22. Gradient image points having a brightness magnitude above the first threshold value are set to logic 1 in an image which is to be newly established. Gradient image points having a brightness magnitude below the first threshold value SW1 are set to logic 0 (step S8). In this way, a binary edge image 25 is provided (see FIG. 8) wherein the image points, which are set to logic 1, form a line area around an edge (see, for example, reference numerals 26 and 27) and the image points, which are set to logic 0, form a background (see, for example, reference numeral 28).

Figure 9:
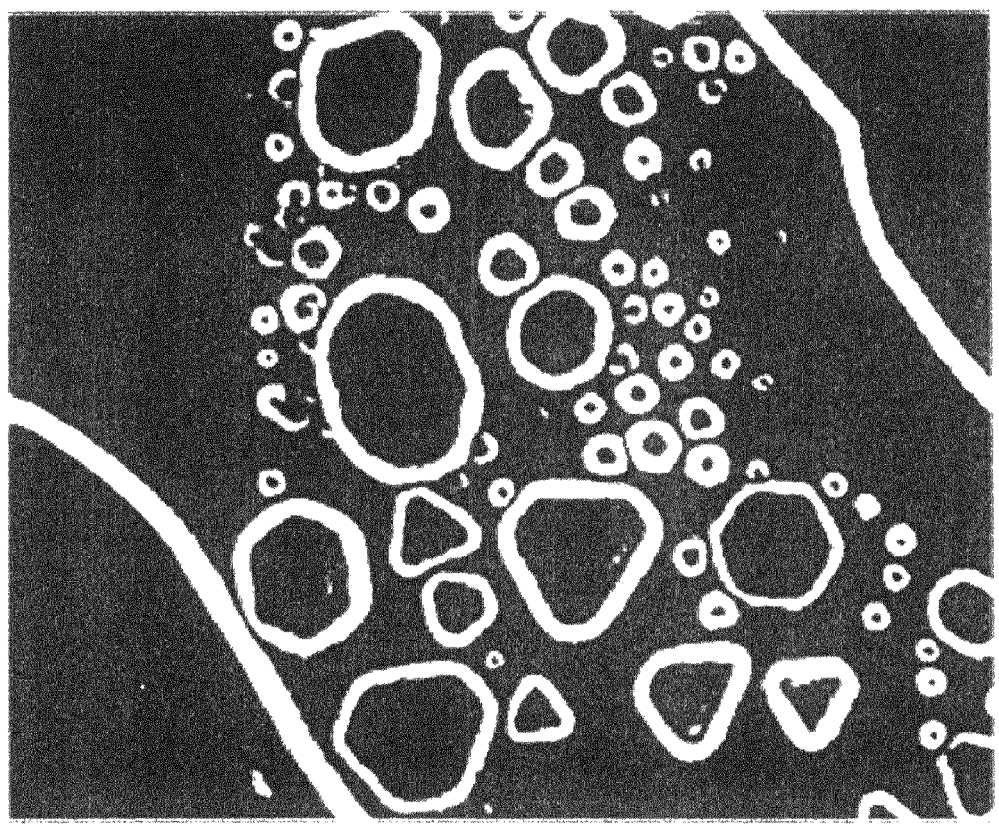
FIG. 9 is a smoothed binary edge image on the basis of the binary edge image of FIG. 8.
Figure 9:
Figure 10:
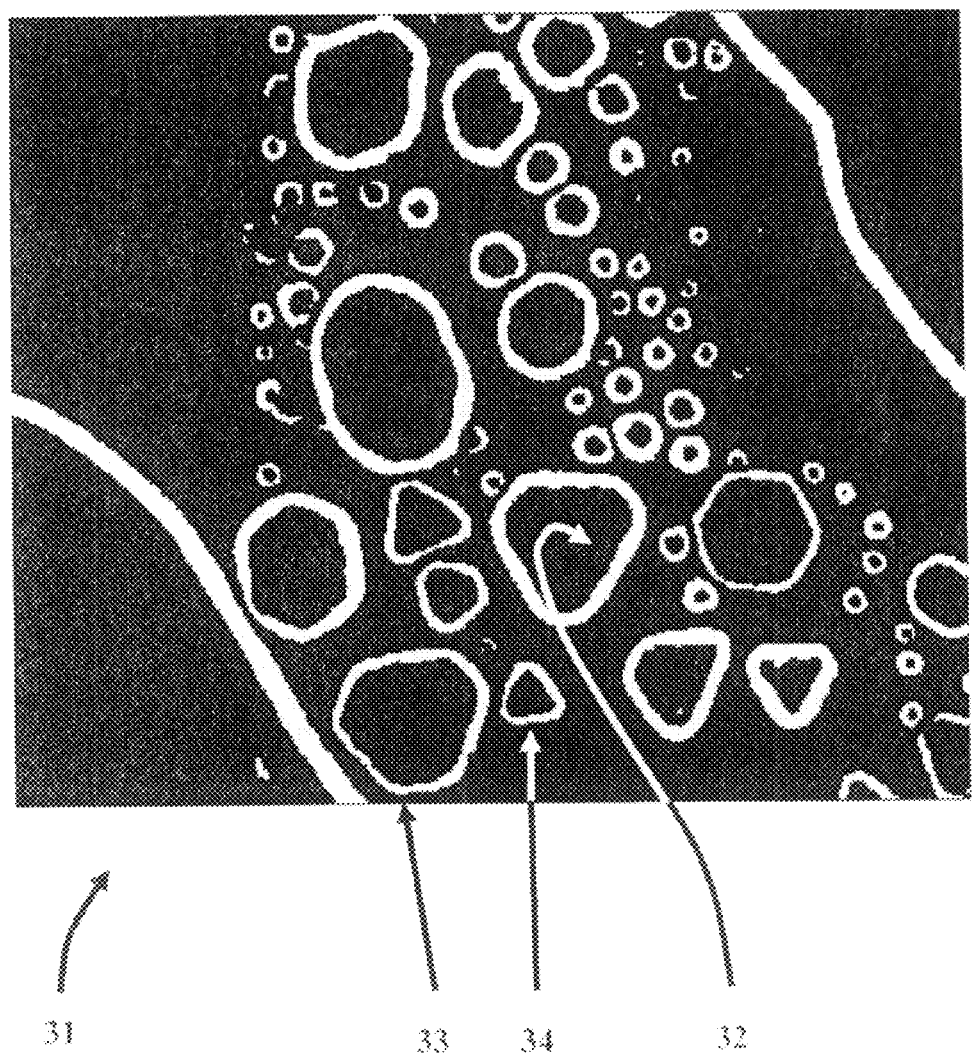
FIG. 10 is an additional binary edge image having line areas around edges on the basis of the image of FIG. 9.

In the event that signals are still present in the binary edge image 25 which are interpreted as being noise (step S8) (see, for example, reference numeral 29 in FIG. 8), a further smoothing process can be carried out (step S9). In this way, a smoothed binary edge image 30 is obtained as shown in FIG. 9. Thereafter, a second threshold value SW2 is set, for example, half of the maximum gradient in the binary edge image 25 (step S10). Image points having a brightness magnitude above the second threshold value are set to logic 1 and image points having a brightness magnitude below the second threshold value SW2 are set to logic 0. The edge image points, which are set to logic 1, form a line area around an edge while the edge image points, which are set to logic 0, form a background. In this way, an additional binary edge image 31 having a line area around an edge (step S11, see also FIG. 10) is obtained. The noise identified in FIG. 8 (see reference numeral 29) is reduced in the additional binary edge image 31 or is no longer present (see reference numeral 32). It is noted that the steps S9 to S11 are optional and can be omitted when, in the binary edge image 25 according to FIG. 8, no noise signals are identified. On the other hand, it is understood that the inquiry of step S8 can be answered automatically with "yes" so that a smoothing process is always carried out independently of the result of step S7.

Figure 11:
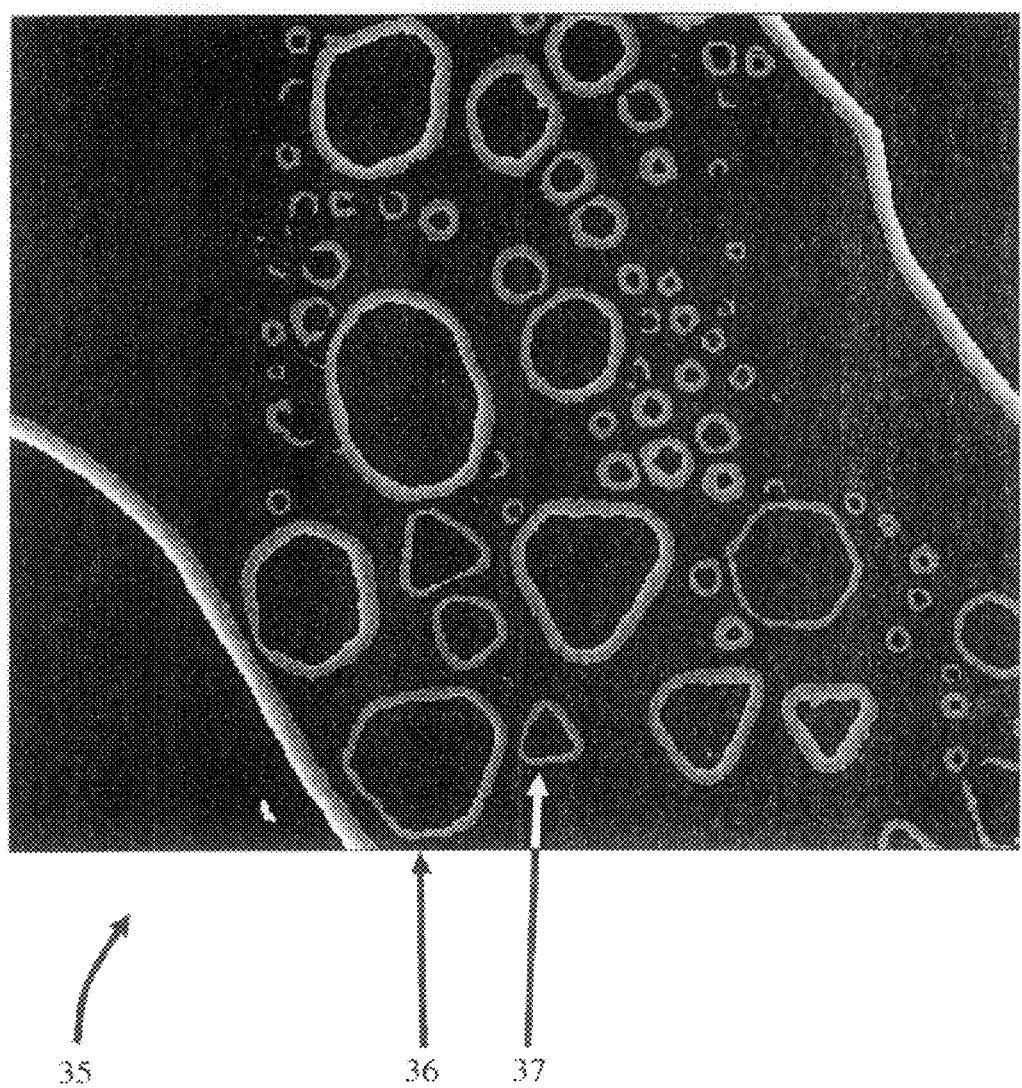
FIG. 11 shows the superposition of the original gray value image of FIG. 1 with the additional binary edge image of FIG. 10.
Figure 12:
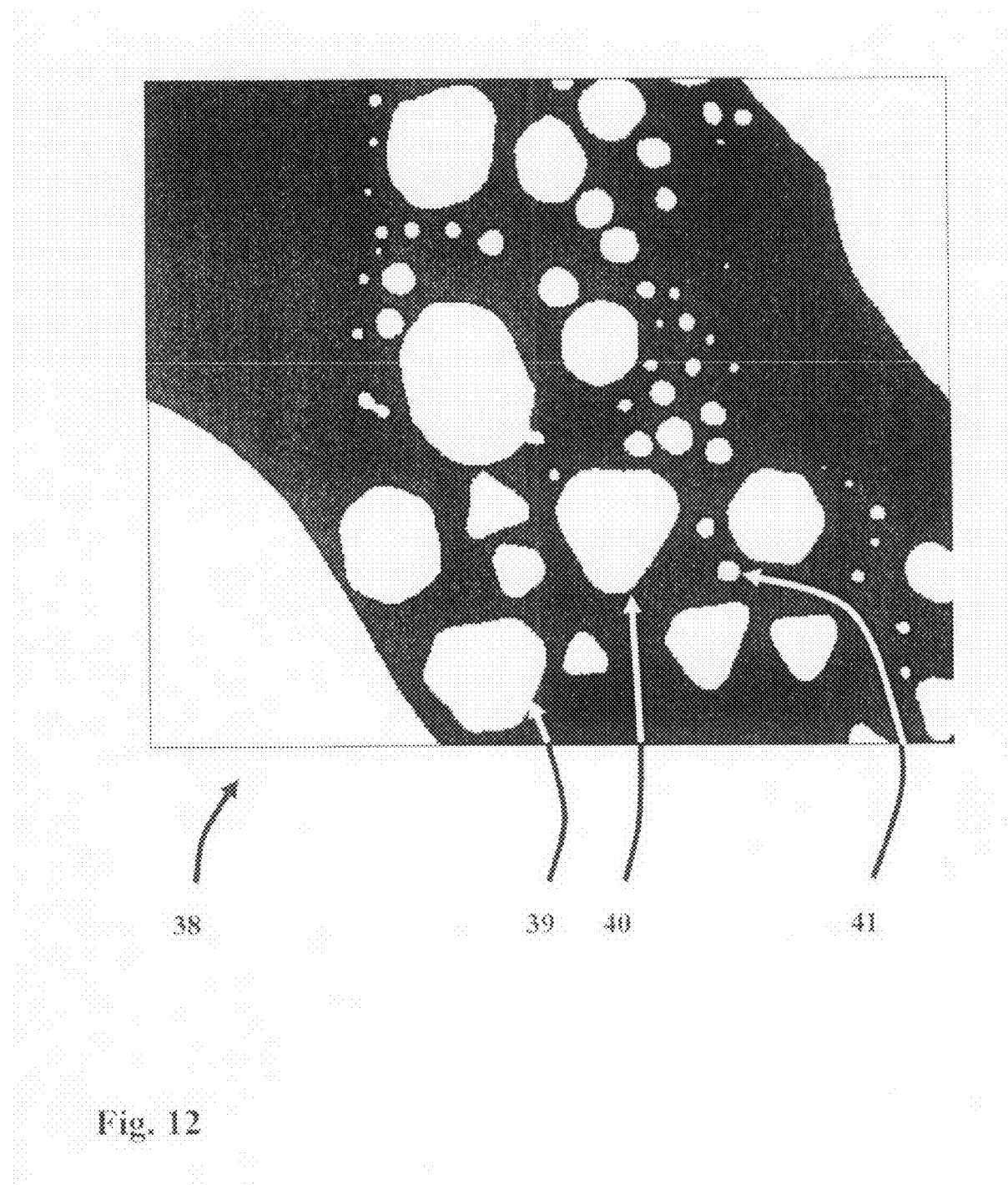
FIG. 12 is a binarized edge image on the basis of FIG. 11.

Thereafter, the gray value image 1 and the binary edge image 25 (or the additional binary edge image 31) are superposed as set forth in step S12. FIG. 11 shows one such superposed image 35 from which it is apparent that the line areas around edges shown in white (see, for example reference numerals 33, 34 in FIG. 10) are filled with gray values of the gray value image 1 (see reference numerals 36 and 37). Thereupon, the brightness magnitudes within each line area around edges in the total image 35 are determined (step S13) and the mean value is computed (step S14) from all brightness magnitudes determined in this manner and this mean value is set as the third threshold value SW3 (step S15). Thereafter, for each image point in the gray value image 1, a comparison is undertaken between its brightness magnitude and the third threshold value (step S16). If the brightness magnitude of the particular image point in the gray value image 1 is greater than the third threshold value SW3, then, in a new image 38 to be formed, the particular gray value image point is set to logic 1 (white) (step S17). If, on the other hand, the brightness magnitude of the particular image point in the gray value image 1 is less than the third threshold value SW3, then the particular gray value image point in the image 38 is set to 0 (black) (step S18). The result is a binarized gray value image 38 as shown in FIG. 12. The objects (2, 3, 4) in the originally recorded gray value image 1 were easily seen by the human eye and are very easily discernible as objects (39, 40, 41) in image 38 after the binarization. Based on this image 38, metrological investigations can be undertaken, for example, or an image resolution of the apparatus is determined with which the digital gray value image 1 was recorded.

Figure 2:
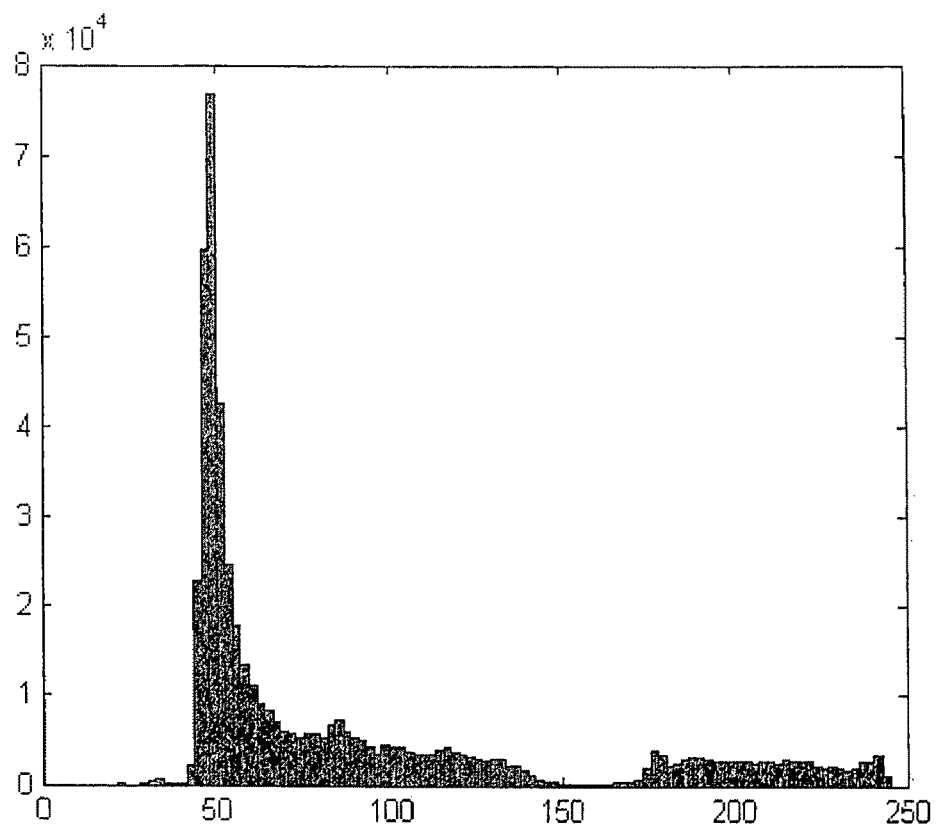
FIG. 2 is a histogram corresponding to FIG. 1.
Figure 2:

The quality of this binarization of the gray value image 1 in accordance with the invention is clearly recognizable from a comparison with an image which was generated by means of a histogram in the conventional manner. A histogram defines graphically the frequency of occurrence distribution of gray value intensities or brightnesses of the image points of an image. The histogram 8, which belongs to gray value image 1, is shown in FIG. 2. On the x-axis, brightness values or intensity levels of the gray values from 0 (black) to 250 (white) are plotted. On the y-axis, the absolute frequency of occurrence of the respective intensity levels is plotted. For a gray value of approximately 50, a clear lower maximum is recognized which is caused by the dark locations 7 in the gray value image 1. Furthermore, gray values having the intensity level of approximately 80 to 150 and approximately 170 to 240 are present. A clear upper maximum for the brighter gray values, which are clearly distinguishable from the lower maximum, is not recognizable.

Figure 3:
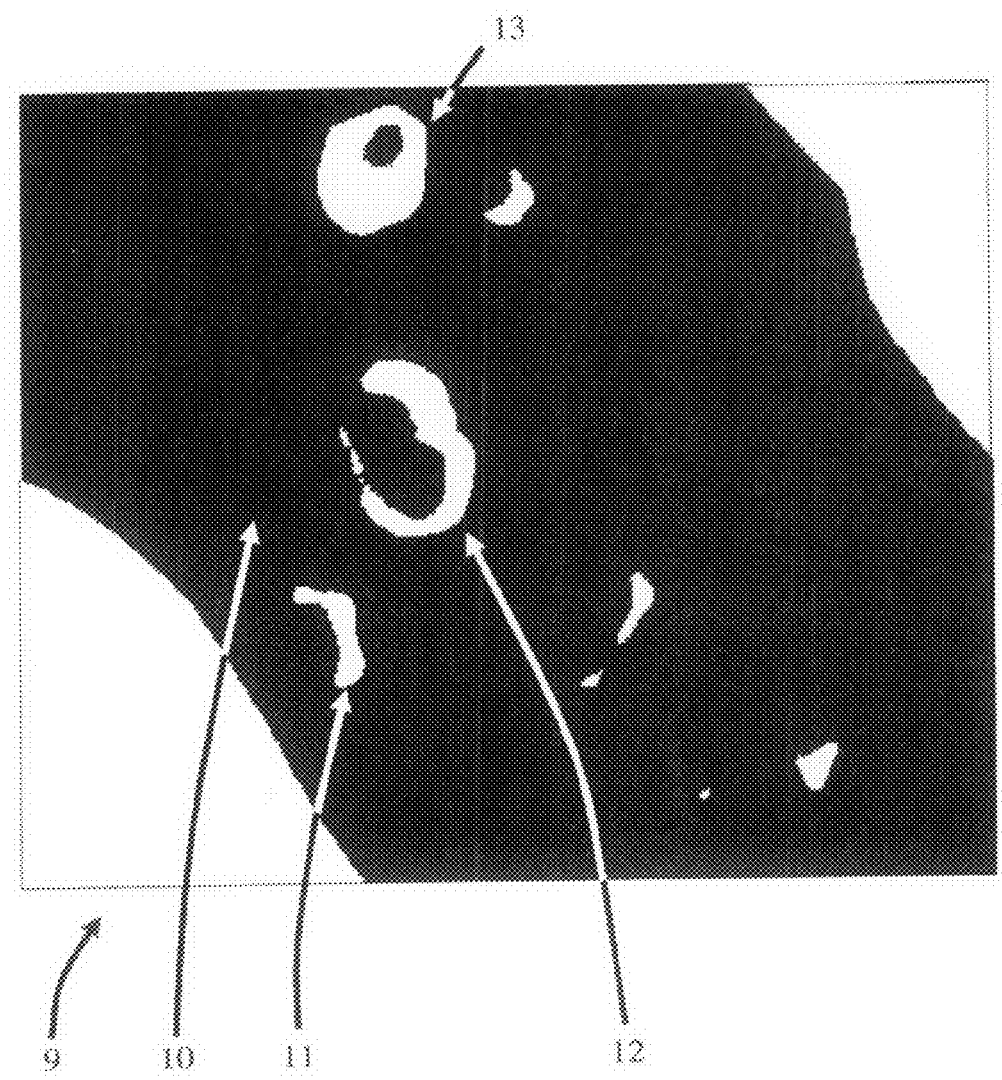
FIG. 3 is a binarized image determined with the aid of the histogram of FIG. 2.

Usually, the threshold value is set to the mean value between a lower maximum and an upper maximum. If it is assumed that an upper maximum of the frequency of occurrence distribution of the gray values in the histogram in FIG. 2 lies approximately at the value 200, the threshold value could be determined therefrom as mean value between upper and lower maxima. This would result in a threshold value of (50+200)/2=125 for the selected numerical values. The binarized image 9, which is computed with this threshold value, is shown in FIG. 3. The image points having a gray value below 125 are set to logic 0 in the binarized image 9 and appear as black points; whereas, the image points having gray values above 125 are set to logic 1 and are shown as white points. The threshold value of 125 leads, in this example, to the situation that a large portion of the image points appear as black points and hardly any objects are recognizable in the binarized image 9. Such a binarized image represents the original gray value image 1 very poorly because, of the approximately 70 objects of different sizes in the gray value image 1, only eight objects (white regions surrounded by black points 10) are identifiable. In addition, in the binarized image 9, only two objects (12, 13) can be detected which were present in the gray value image as round objects. The threshold value of 125, which is determined with the conventional method on the basis of a mean value determination between upper and lower maxima of a gray value histogram, is thereby a value which is too high and leads to an unusable result.

In the present example of the gray value image 1, a threshold value of 78 is determined with the method of the invention which lies far from the value of 125 according to the conventional method. The method of the invention is therefore especially well suitable for a histogram which does not run bimodally, that is, has two maxima clearly separated from each other.

It is understood that the foregoing description is that of the preferred embodiments of the invention and that various changes and modifications may be made thereto without departing from the spirit and scope of the invention as defined in the appended claims.

What is claimed is:

1. A method for binarizing a digital gray value image to generate a binarized gray value image, the method comprising the steps of:

generating a binary edge image from said gray value image so as to cause existing edges to be determined as line areas around an edge;

after generating the binary edge image, making an inquiry as to whether the binary edge image shall become subjected to a smoothing process;

in a first case, in which the binarized edge image shall not become subjected to a smoothing process, generating a first mean value of gray values of said gray value image in all regions which correspond to said line areas around an edge of the binary edge image with said mean value defining a threshold value for the generation of the binarized gray value image;

in a second case, in which the binary edge image shall be subjected to a smoothing process, generating a smoothed binary edge image and generating an additional binary edge image based on the smoothed binary edge image, and generating a second mean value of gray values of said gray value image in all regions which correspond to line areas around an edge of the additional binary edge image with said second mean value defining a threshold value for the generation of the binarized gray value image; and, generating the binarized gray value image based on the first mean value in cases in which the binarized edge image has not become subjected to a smoothing process and on the basis of the second mean value in cases in which the binarized edge image has become subjected to a smoothing process.

2. The method of claim 1, wherein said binary edge image is generated utilizing a gradient image generated on the basis of said gray value image.

3. The method of claim 2, wherein said gradient image is generated by coupling a first directional gradient image with a second directional gradient image; and said first directional gradient image is formed in that gradients in said gray value image are determined in a first direction and said second directional gradient image is formed in that gradients in said gray value image are determined in a direction perpendicular to said first direction.

4. The method of claim 2, wherein a first additional threshold value is assigned to said gradient image; and, gradient image point having a brightness magnitude above said first additional threshold value are set to logic 1 and gradient image points having a brightness magnitude less than said first additional threshold value are set to logic 0 so that said binary edge image is formed wherein the gradient image points set to logic 1 form line areas around edges and the gradient image points set to logic 0 form a background.

5. The method of claim 4, wherein said first additional threshold value is one-quarter of the maximum gradient in said gradient image.

6. The method of claim 5, wherein said binary edge image is subjected to a smoothing process utilizing a median filter.

7. The method of claim 5, wherein a second additional threshold value is set; and, said second additional threshold value is half of the maximum gradient in said edge image which had been subjected to a smoothing process.

8. The method of claim 2, wherein said gradient image is generated utilizing a difference operator selected from the group comprising: Sobel operator, Prewitt operator, Laplace operator, Kirsch operator and Roberts operator.

9. The method of claim 2, comprising the further step of subjecting said gray value image to a smoothing process before generating said gradient image.

10. The method of claim 9, wherein said smoothing process is performed with a median filter.

11. An image recording arrangement comprising a computer system including a digital computer and a computer program loadable into a memory of said digital computer, said computer program having a software code for carrying out a method for binarizing a digital gray value image to generate a binarized gray value image, the method including the steps of:

generating a binary edge image from said gray value image so as to cause existing edges to be determined as line areas around an edge;

after generating the binary edge image, making an inquiry as to whether the binary edge image shall become subjected to a smoothing process;

in a first case, in which the binarized edge image shall not become subjected to a smoothing process, generating a first mean value of gray values of said gray value image in all regions which correspond to said line areas around an edge of the binary edge image with said mean value defining a threshold value for the generation of the binarized gray value image;

in a second case, in which the binary edge image shall be subjected to a smoothing process, generating a smoothed binary edge image and generating an additional binary edge image based on the smoothed binary edge image, and generating a second mean value of gray values of said gray value image in all regions which correspond to line areas around an edge of the additional binary edge image with said second mean value defining a threshold value for the generation of the binarized gray value image; and, generating the binarized gray value image based on the first mean value in cases in which the binarized edge image has not become subjected to a smoothing process and on the basis of the second mean value in cases in which the binarized edge image has become subjected to a smoothing process.

12. A computer program stored on a non-transitory machine-readable medium, said computer program comprising a software code for carrying out a method for binarizing a digital gray value image to generate a binarized gray value image, the method including the following steps when executing the program on a computer:

generating a binary edge image from said gray value image so as to cause existing edges to be determined as line areas around an edge;

after generating the binary edge image, making an inquiry as to whether the binary edge image shall become subjected to a smoothing process;

in a first case, in which the binarized edge image shall not become subjected to a smoothing process, generating a first mean value of gray values of said gray value image in all regions which correspond to said line areas around an edge of the binary edge image with said mean value defining a threshold value for the generation of the binarized gray value image;

in a second case, in which the binary edge image shall be subjected to a smoothing process, generating a smoothed binary edge image and generating an additional binary edge image based on the smoothed binary edge image, and generating a second mean value of gray values of said gray value image in all regions which correspond to line areas around an edge of the additional binary edge image with said second mean value defining a threshold value, for the generation of the binarized gray value image; and, generating the binarized gray value image based on the first mean value in cases in which the binarized edge image has not become subjected to a smoothing process and on the basis of the second mean value in cases in which the binarized edge image has become subjected to a smoothing process.

13. The computer program of claim 12, wherein said software code enables said digital computer to carry out said method when said program is loaded into said non-transitory machine-readable medium.

* * * * *

UNITED STATES PATENT AND TRADEMARK OFFICE
CERTIFICATE OF CORRECTION

| | | |
|---|---|---|
| PATENT NO. | : 8,064,714 B2 | Page 1 of 1 |
| APPLICATION NO. | : 11/808283 | |
| DATED | : November 22, 2011 | |
| INVENTOR(S) | : Albiez | |

It is certified that error appears in the above-identified patent and that said Letters Patent is hereby corrected as shown below:

In Column 7:
Line 27: delete "point" and substitute -- points -- therefor.

Column 8:
Line 51: delete "value," and substitute -- value -- therefor.

Signed and Sealed this
Sixth Day of March, 2012

David J. Kappos
*Director of the United States Patent and Trademark Office*